(12) United States Patent
Quick et al.

(10) Patent No.: US 6,329,625 B1
(45) Date of Patent: Dec. 11, 2001

(54) METHOD OF MAKING A SEAL

(75) Inventors: Nathaniel R. Quick, Lake Mary, FL (US); Robert Malanga, Monroe; Matthew M. Smolowitz, Wethersfield, both of CT (US)

(73) Assignee: USF Filtration & Separations Group, Inc., Timonium, MD (US)

( * ) Notice: Subject to any disclaimer, the term of this patent is extended or adjusted under 35 U.S.C. 154(b) by 0 days.

(21) Appl. No.: 09/411,869

(22) Filed: Oct. 4, 1999

Related U.S. Application Data
(60) Provisional application No. 60/103,037, filed on Oct. 5, 1998.

(51) Int. Cl.[7] .......................... B23K 1/005; B23K 31/02; B01D 33/067
(52) U.S. Cl. ...................... 219/85.13; 228/115; 228/228; 210/493.2; 210/496
(58) Field of Search .............................. 219/85.12, 85.13; 210/493.2, 496, 510.1; 228/115, 228

(56) References Cited

U.S. PATENT DOCUMENTS

| | | |
|---|---|---|
| 945,632 | 1/1910 | Strahl . |
| 2,413,991 | 1/1947 | Newman . |
| 3,423,909 | 1/1969 | Bennett et al. . |
| 3,498,464 | 3/1970 | Frosolone . |
| 3,985,654 | * 10/1976 | Pall . |
| 4,170,556 | * 10/1979 | Pall . |
| 4,186,099 | 1/1980 | Henschel, Jr. et al. . |
| 4,304,580 | 12/1981 | Gehl et al. . |
| 4,350,592 | 9/1982 | Kronsbein . |
| 4,728,421 | 3/1988 | Moddemeyer . |
| 4,764,275 | 8/1988 | Robichaud . |
| 5,015,316 | 5/1991 | Ostreicher et al. . |
| 5,028,327 | * 7/1991 | Ostreicher et al. . |
| 5,059,326 | * 10/1991 | Haerle . |
| 5,211,846 | 5/1993 | Kott et al. . |
| 5,298,160 | 3/1994 | Ayers et al. . |
| 5,545,323 | * 8/1996 | Koehler et al. . |
| 5,670,044 | * 9/1997 | Ogata et al. . |
| 5,733,452 | * 3/1998 | Whitlock . |
| 6,063,332 | * 5/2000 | Imamura et al. . |
| 6,096,212 | * 8/2000 | Quick et al. . |
| 6,180,909 | * 1/2001 | Quick et al. . |

* cited by examiner

*Primary Examiner*—Tom Dunn
*Assistant Examiner*—Kiley Stoner
(74) *Attorney, Agent, or Firm*—Frijouf, Rust & Pyle, P.A.

(57) ABSTRACT

An improved seal and method of making is disclosed for sealing a filter element to a filter mounting. The improved seal comprises a bonding pad formed from a sintered matrix of randomly oriented metallic fiber. The bonding pad is disposed between the filter element and the filter mounting. A mechanical fastener coacts between the filter element and the filter mounting for compressing the bonding pad to provide a seal between the filter element and the filter mounting. The bonding pad may be heated to create a frangible seal.

25 Claims, 12 Drawing Sheets

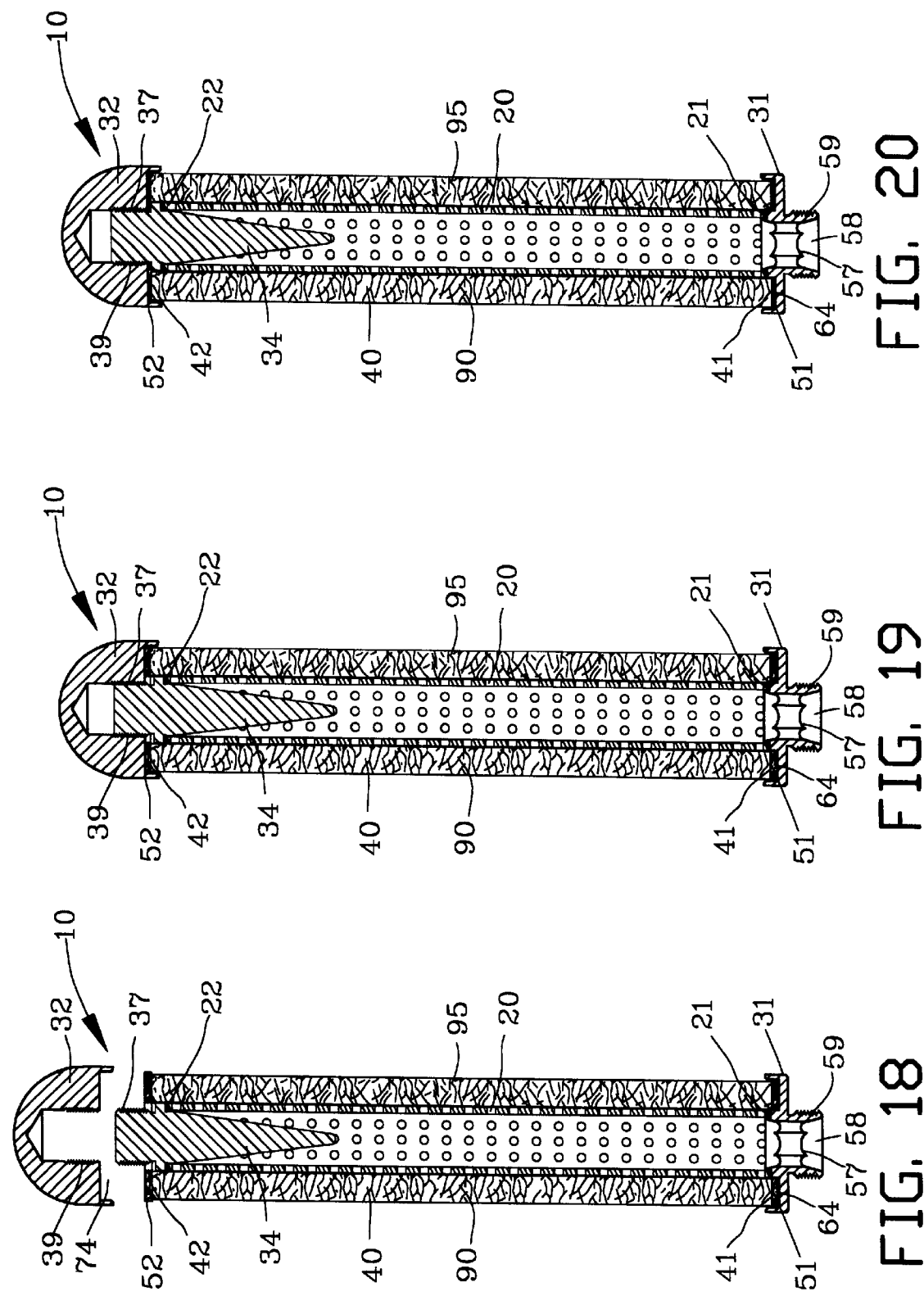

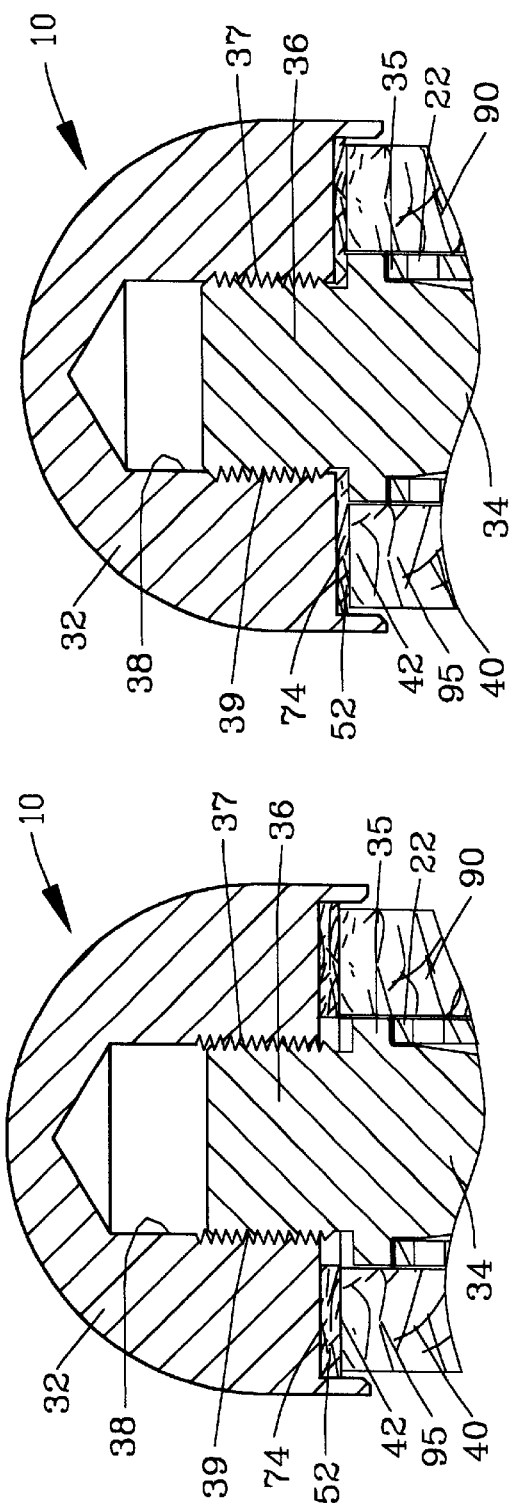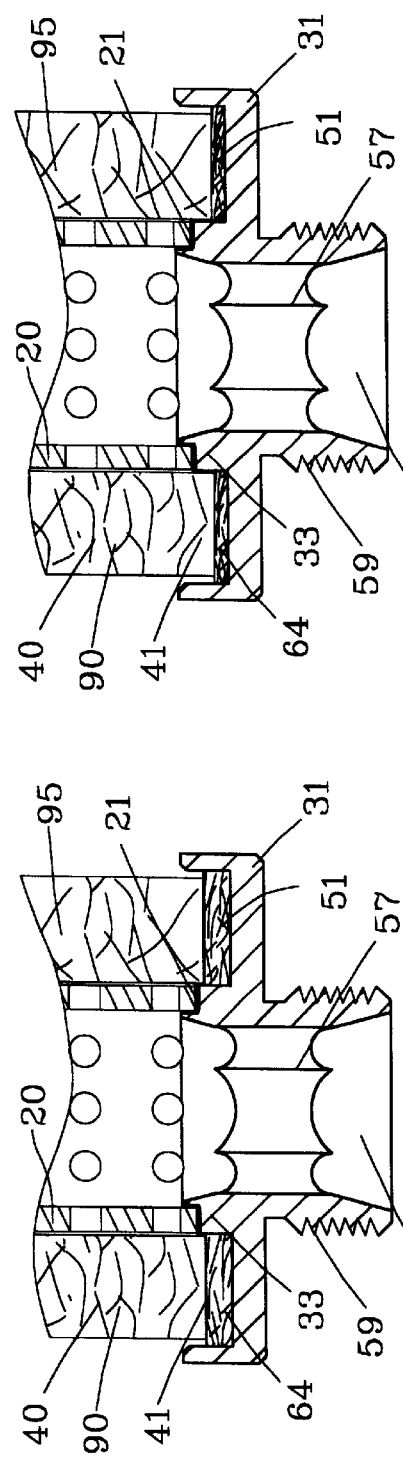
FIG. 21
FIG. 22

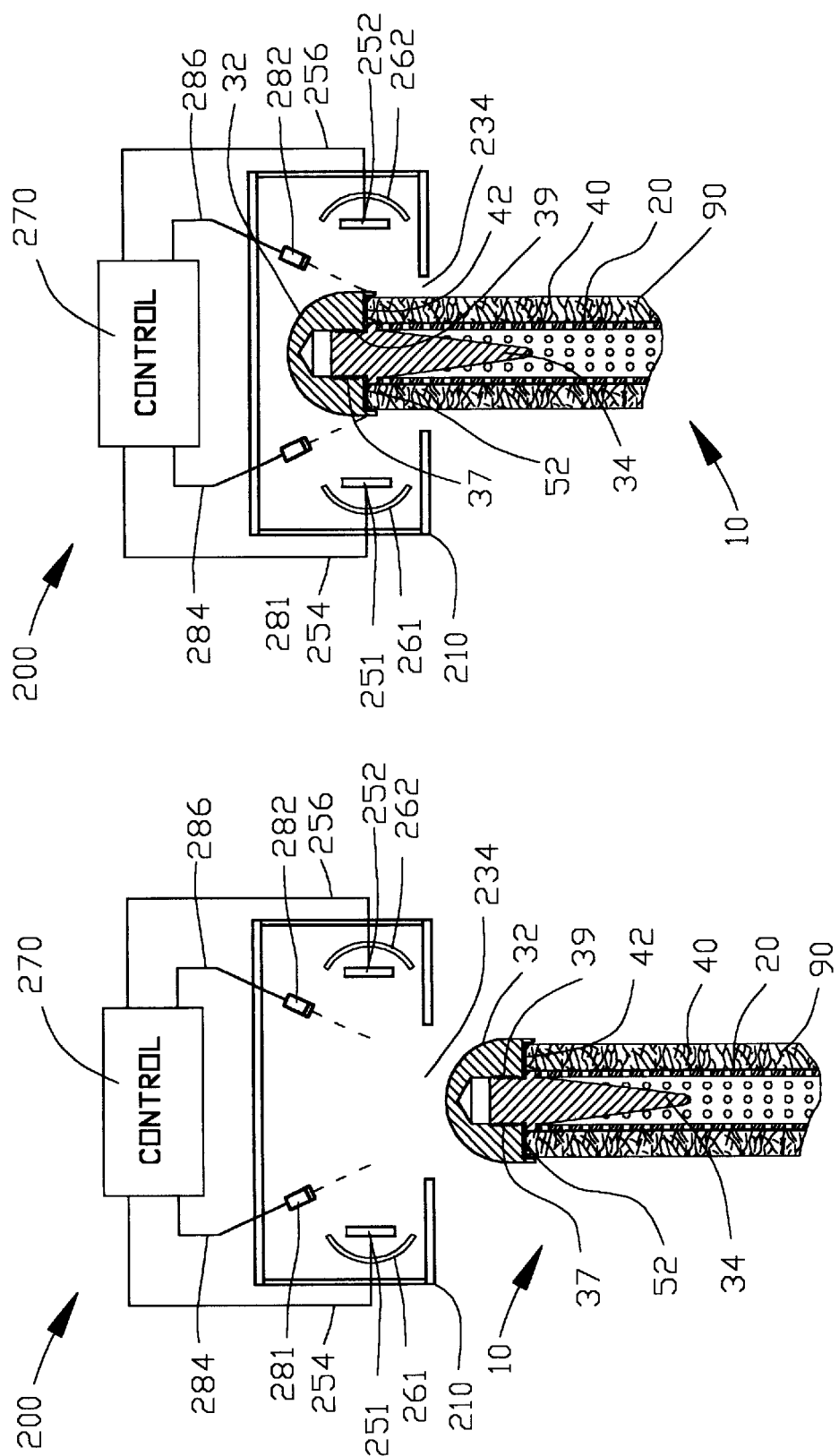

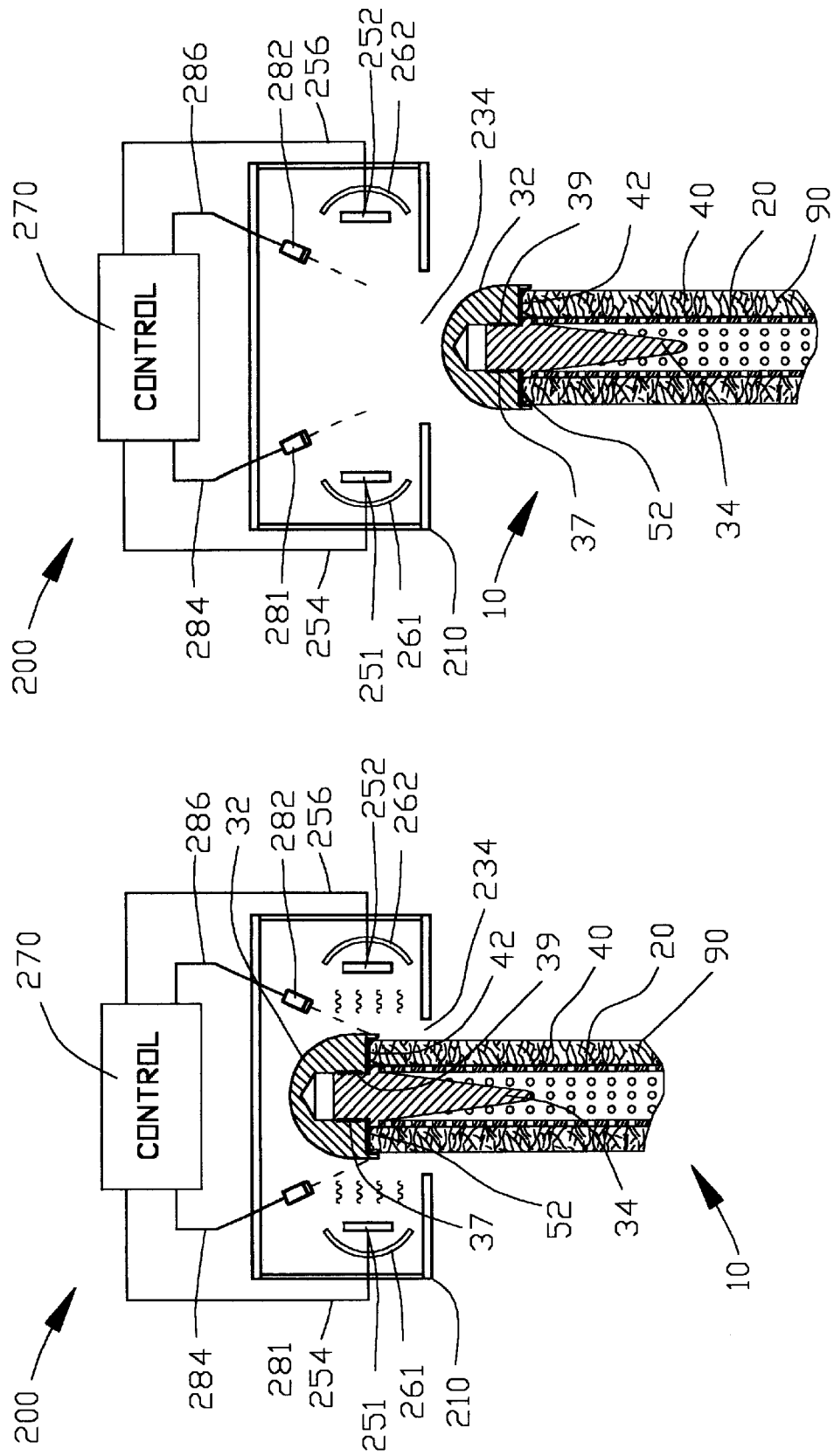

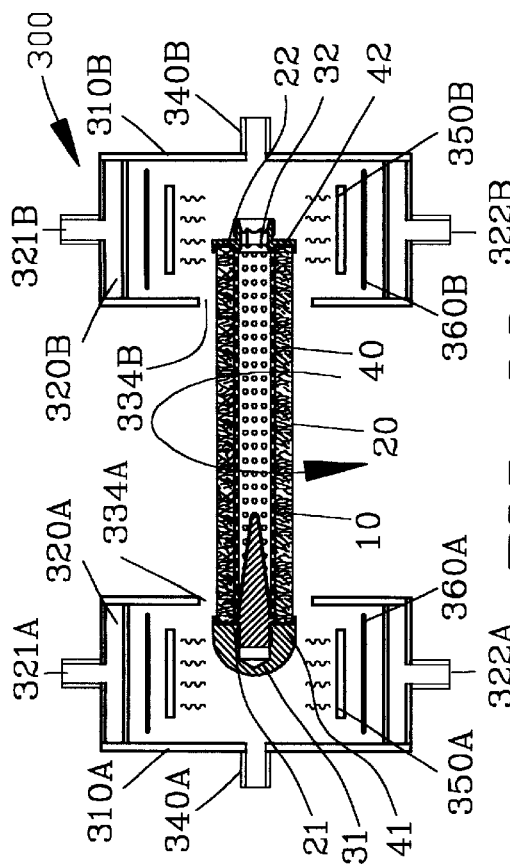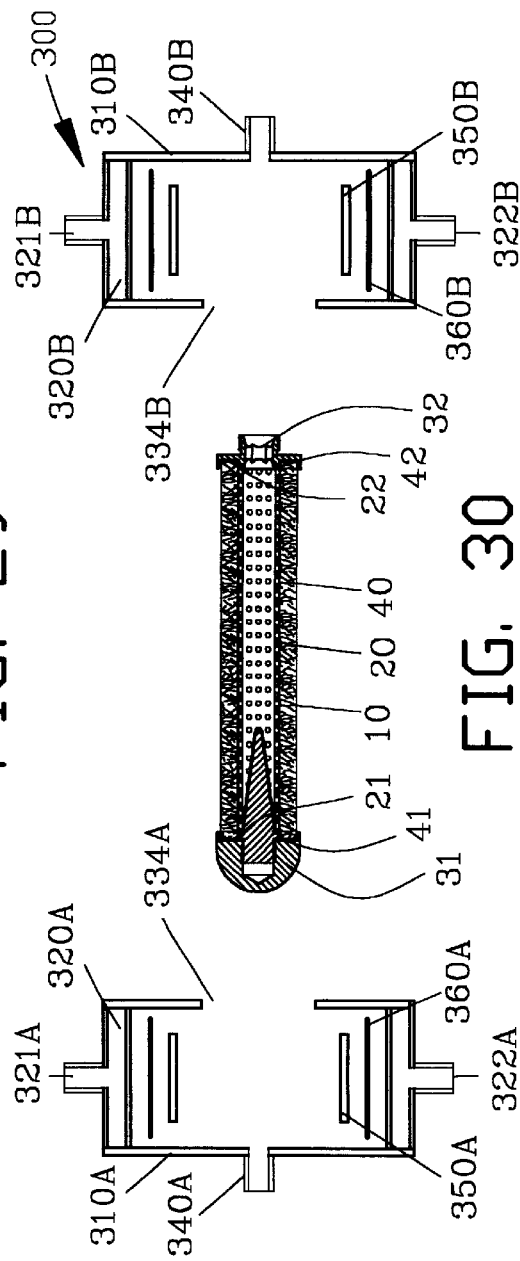

METHOD OF MAKING A SEAL

CROSS-REFERENCE TO RELATED APPLICATIONS

This application claims benefit of U.S. Provisional application Ser. No. 60/103,037 filed Oct. 5, 1998. All subject matter set forth in application Ser. No. 60/103,037 is hereby incorporated by reference into the present application as if fully set forth herein.

BACKGROUND OF THE INVENTION

1. Field Of The Invention

This invention relates to the filtering of a fluid and more particularly to an improved seal for sealing a filter element to a filter mounting and the method of making the seal. This invention also relates to an improved frangible seal for sealing a filter element to a filter mounting and the method of making the frangible seal.

2. Background Of The Invention

Various apparatuses and methods have been utilized by the prior art for removing suspended contaminants from a contaminated fluid. In general, the contaminated fluid is passed through a porous filtering media by an external pressure or an external force. The pore size of the porous filtering media is selected to permit the passage of the fluid therethrough while inhibiting the flow of contaminants through the porous filtering media. The contaminants are blocked by the porous filter media while the fluid passes through the porous filter media. The fluid flowing through the filter media is purged of the contaminants.

After a period of time, the contaminants collected by the filter media overlay the pores of the porous filter media thereby blocking the pores and reducing the passage of the fluid therethrough. The blockage of the pores of the filter media by the collected contaminants reduce the flow rate of the fluid through the fluid filter thereby rendering the fluid filter unsuitable for continued used. In many cases, the fluid filter was discarded and replaced with a new fluid filter to reestablish the desired flow rate of the fluid in the fluid filtering process.

In a typical fluid filter, a porous filter media is secured to a filter support or the like for mounting or suspending the filter media. In the case of a cylindrical filter, the filter media is formed into a cylindrical configuration and a first and a second cylindrical end of the filter media is bonded to a first and a second filter mounting member such as a first and a second end cap. The first and second end caps mount the filter media relative to a fluid input source and a fluid output source.

In many cases, a welding process was used for affixing the first and second cylindrical ends of the filter media to the first and second end caps. The welding process was accomplished by first placing the filter media on a supporting core. The first and second cylindrical ends of the filter media were swaged to compact the filter media onto an underlying supporting core. A first and a second welding ring were welded to the compacted first and second ends of the filter media. Finally, the first and second end caps were welded to the first and second welding rings. The compacting and welding of the first and second cylindrical ends of the filter media essentially destroyed all filtering capability of the filter media near the compacted ends of the filter media.

Others in the prior art have devised devices and methods for creating a bond between the filter media and the filter support. These other devices and methods have used means other than welding to affix a filter media and the filter support.

U.S. Pat. No. 2,642,187 to Bell discloses a replaceable filter unit of the character described comprising a pleated filter body of resin-impregnated paper arranged in tubular form and with the pleats extending substantially radially, end discs of the same material as the filter body closing off opposite ends of the body, said discs being bonded by a thermosetting resin adhesive to opposite end edges of said pleats, said adhesive lying between under faces of said discs and corresponding end edges of said pleats in contact therewith, and having turned down rims bonded adhesively by thermosetting resin adhesive to folds of the pleats, said adhesive lying between inner faces of the turned down rims and the folds of the pleats in contact therewith.

U.S. Pat. No. 2,877,903 to Veres discloses a unit for filtering particulate matter from a fluid flowing therethrough, a hollow filter body comprising a screen equipped with a screen closure at one end thereof, a cap substantially closing the other end of said screen body and defining connecting means for communicating the interior of said filter body with a fluid flow line, and a mass of pellets defining a substantially continuous coating along the outer surface of the screen end closure and screen body and being bonded to each other and to the screen body and end closure to form an integrated structure therewith, whereby both said screen body and screen end closure define filtering areas through which fluid may pass to the interior of the screen body.

U.S. Pat. No. 2,957,235 to Steinberg discloses a method of assembling first and second elements composed of a mixture of powdered metal and resinous binder comprising placing said first element on a support, heating said first element until said resin binder therein becomes pliable without the element losing shape, placing said second element against said first element, applying pressure to said second element until a bond is formed by the resinous binder between said first and second elements, removing the elements from said support, cooling the assembly of said elements, supporting said assembly with sinter material in a sintering zone, and sintering said assembly into a unitary sintered structure.

U.S. Pat. No. 3,379,000 to Webber et al discloses a tow of metal filaments each having a maximum cross-section of less than approximately 10 microns and a length of approximately 50 feet and having a trace amount of a different material diffused in the outer surface thereof.

U.S. Pat. No. 3,490,902 to Fisher discloses a method for forming porous structures useful, for example, as filters, diffusion membranes, sound absorbers, and the like. The structures contain a sintered metal portion at least one surface of which having embedded and bonded thereto a reinforcing member. Some of the fibers in the fiber metal portion are bonded to each other and to the reinforcing member.

U.S. Pat. No. 3,505,038 to Luksch et al. discloses a mass comprising a plurality of randomly disposed hair-like substantially solid metal fibers, wherein said fibers are substantially free from particles of degradation and air transportable, and wherein said mass has resilient loft, substantial uniformity of density and distribution of voids, handlable green strength, and a density range of from one percent to eighty-five percent.

U.S. Pat. No. 3,716,347 to Bergstrom et al. discloses metal parts joined together with sintered powdered metal by applying a mixture of powdered metal and an organic heat-fugitive binder to the parts at the locus of the joint to be formed therebetween, assembling the parts in their desired joined configuration, and heating the assembly to volatilize or burn-off the binder and sinter the powdered metal.

U.S. Pat. No. 4,114,794 to Storms discloses an autogenous or sinter bond between metallic filter media and other metal components of a filter assembly is produced by joining the parts through a diffusion bonding membrane. The membrane comprises a web of small diameter metal fibrils which will sinter bond to both the filter media and the other filter parts to form a physically strong and leak-free seal.

U.S. Pat. No. 4,169,059 to Storms discloses an autogenous or sinter bond between metallic filter media and other metal components of a filter assembly is produced by joining the parts through a diffusion bonding membrane. The membrane comprises a web of small diameter metal fibrils which will sinter bond to both the filter media and the other filter parts to form a physically strong and leak-free seal.

U.S. Pat. No. 4,290,889 to Erickson discloses a new and unique means for preventing the crowns of a backflushable filter element unit from splitting which has heretofore been caused by the cyclic action of the cleaning and backflushing. A layer of staple material is positioned adjacent the outer layer of filter media to prevent bellowing or ballooning. An additional staple layer may be positioned adjacent the inner layer of filtered media to provide additional support. With both staple layers in position on both sides of the filter media, the media is firmly captured and the crowns will not split.

U.S. Pat. No. 4,676,843 to Nazmy discloses two component workpieces consisting of different superalloys or of the same superalloy are bonded together to form a monolithic whole, with the insertion of a layer consisting of a powder of composition similar to or identical to that of the component workpieces by hot pressing in accordance with the diffusion bonding process. The workpiece surfaces to be bonded do not have to have narrow tolerances, but are with advantage provided with grooves. The process is suitable for the bonding together of component workpieces consisting of a dispersion-hardened, nickel-based superalloy or of component workpieces of such an alloy and workpieces consisting of a cast conventional superalloy.

U.S. Pat. No. 4,875,616 to Nixdorf discloses a method for producing a high temperature, high strength bond between a ceramic shape and a metal substrate, such as joining a ceramic cap to a piston for an internal combustion engine. The composite joint is effected through the use of a ceramic preform fabricated using fibers, whiskers, platelets or sponge-like particles having the same composition as the ceramic body. The preform is joined to the ceramic shape by using a ceramic slip having a ceramic corresponding in composition with the ceramic body, with this juncture being heated to achieve a secure bond. The preform is joined to the metal substrate by first infiltrating the preform with molten material corresponding to the substrate, and then pressure bonding the infiltrated preform to the substrate after the molten material has solidified. The substrate can be metal or metal alloy. An example is given for the bonding of silicon carbide to a 300 series aluminum.

U.S. Pat. No. 5,230,760 to Tanabe discloses a filter cartridge of micro filtration membrane pleats type, by which it is possible to stably manufacture products of high quality and to reduce the manufacturing cost. In the method for manufacturing a filter cartridge of micro membrane pleats according to the present invention, an initial portion and a last portion with pleats of a micro filtration membrane are welded together to prepare an endless micro membrane, and a filter element provided with a micro filtration membrane is welded on two end plates. A thin bonding auxiliary plate made of the same material as the end plates, having an opening at its center and molten at relatively low temperature, is welded to filter element and end plates which are heated in advance.

U.S. Pat. No. 5,279,733 to Heymans discloses filter candle apparatus comprising an elongated mesh pack defining an axial opening therethrough and having an end cap fixedly secured to one end and an end fitting fixedly secured to the opposite end. The end fitting defines an opening therethrough which is coaxial with the axial opening of the mesh pack. A hollow core tube defines a plurality of openings therein positioned within the axial opening of the mesh pack and being removably slidable therethrough. The core tube has an end member surrounding one end thereof that engage the end fitting of the mesh pack. A ring-shaped bearing is recessedly held within and by the end fitting of the mesh pack and engaging the core tube proximate the end member. An outer guard defines apertures therein adjacently surrounding the mesh pack.

U.S. Pat. No. 5,350,515 to Stark et. al. discloses a filter cartridge including a cylindrical filter medium potted into a top cap, and having an internally potted bottom closure molded in place inside the filter medium.

U.S. Pat. No. 5,395,039 to Koehler et. al. discloses such a braze material and process. The same braze material and process is disclosed by a prior NICROBRAZ Technical Bulletin of 1991 published by the Wall Colmony Corporation regarding a braze material sold under the trademark "NICROBRAZ".

U.S. Pat. No. 5,545,323 to Koehler et al. discloses a filter assembly and a method of making a filter assembly described wherein a filter pack is seated in an end cap and contacted with a particulate material and a settling liquid of low viscosity to form a filter assemblage. The filter assemblage is sintered to form a strong, virtually impermeable bond therebetween.

Others in the prior art have devised devices and methods for cleaning the fluid filter to remove the contaminants collected by the filter media. Typically, the process of removing the contaminants from the filter media involved the flow of a solvent material such as acids, bases and organics or the like through the filter media in a direction opposite to the direction of the fluid through the fluid filter. In some cases, the solvent material was passed through the filter media when the fluid filter was raised to an elevated temperature.

The filter media that is capable of being cleaned by a flowing solvent at an elevated temperature must be constructed in an entirely different manner and using entirely different materials in order to withstand the process of cleaning the filter media. The filter media that is capable of being cleaned must be capable of withstanding the reverse flow of a solvent as well as must be capable of withstanding the elevated temperature.

The filter media that is capable of withstanding the reverse flow of a solvent and/or an elevated temperature is more costly than the filter media of a disposable filter. Likewise, the material used to secure the filter media within the fluid filter must be capable of withstanding the solvent and the elevated temperature. The increased cost of the materials of the reusable fluid filter added substantially to the overall manufacture cost of the reusable fluid filter. Accordingly, reusable fluid filters have not found widespread use in many applications since the cost of such filters prohibits the widespread use thereof.

U.S. Pat. No. 945,632 to Strahl discloses a filter comprising a casing, a perforated tube therein, spaced caps removably mounted upon the tube, and filter material between the tube and the casing. The caps have members extending longitudinally of the tube over the material to hold the same in place.

U.S. Pat. No. 2,413,991 to Newman discloses in a filter, the combination of a substantially cylindrical central cone member of apertured sheet metal, the core member being provided upon its upper end with an annular metal fitting of tubular shape threaded to be engaged by a tubular threaded member. A substantially flat annular metal member has an inwardly extending cup-shaped cylindrical formation received in and secured to the core and having a radially extending flange for supporting a gasket. The radially extending flange also carries an inwardly turned cylindrical retaining flange. A similar metal member for the opposite end of the filter, comprises an annular member having an inwardly extending cup-shaped depression, a flat annular flange for receiving a gasket and an inwardly extending cylindrical retaining flange. The latter cup-shaped member has an aperture to receive the threaded tubular portion of the fitting. A filter unit of stiff characteristics is adapted to resist compression as a column, the filter unit being interposed between the gaskets of the first cup-shaped member and the second cup-shaped member and clamped between the gaskets by means of the tubular threaded member.

U.S. Pat. No. 3,423,909 to Bennett et al. teaches an air cleaner of the dry type having a housing, an air inlet, a wall member, a clean air outlet through the wall member and an opening for dust removal. A filter element assembly includes a generally cylindrical outer screen mounted in the housing to separate coarser matter from finer matter and a porous filter element concentrically disposed within the outer screen through which the incoming air is passed to separate out matter in suspension. An inner screen is concentrically disposed within the porous filter element. The inner screen is wire mesh to separate out additional matter passing through the assembly. A first and second sealing means are located respective the first and second ends of the filter element. The ends of the inner and outer screens are molded into the sealing means for providing a seal for the filter element assembly. The filter element assembly is disposed within the housing coaxially with the clean air outlet, the first sealing means engaging the wall member around the clean air outlet.

U.S. Pat. No. 3,498,464 to Frosolone discloses a filter cartridge for filtering out particulate matter in used solvents such as perchloroethylene used in dry cleaning systems. The filter cartridge is of a knockdown construction for ready replacement and reuse having interfitted perforated tubes.

U.S. Pat. No. 4,186,099 to Henschel, Jr. et al. sets forth a consumer rebuildable filter cartridge for mounting in a fluid filter chamber in a fluid flow path which includes inner and outer perforated tubular members mounted coaxially on a fixed end cap to form an annular chamber. A filter element of pleated sheet filter material is formed in a tubular construction and fitted into the annular space defined between the inner and outer tubular members and is sealed at each end by suitable resilient seal washers, compressed between the fixed end cap and a movable end cap. The inner and outer tubular members forms support structure for supporting the tubular paper filter element and permits the removal and replacement of such filter elements.

U.S. Pat. No. 4,304,580 to Gehl et al. discloses an air cleaner which includes a support having a first concave conical surface and compression means extending along the axis of the surface away from the apex of the surface. A hollow inner filter including a first end cap with a rim define a first convex conical surface having the same apex angle as the first concave surface, and a second end cap for axial engagement by the compression means. A hollow outer filter includes an end cap with a resilient lip extending inwardly to be sealingly received between the conical surfaces when the compression means engages the second end cap. The second end cap of the inner filter may have a second convex conical surface. The outer filter may have a second end cap with a resilient lip extending to be sealingly engaged by the second convex conical shape.

U.S. Pat. No. 4,350,592 to Kronsbein sets forth a cartridge filter for gases and liquids having a filter element clamped between an upper and lower cover. The filter includes a profile ring composed of a sealing compound which is firmly connected to the upper end face and an identical and corresponding profile ring firmly connected to the lower end face of the filter element. Sealing rings are embedded in the profile rings. The covers each includes one circumferential groove engaging around the sealing rings in a claw-like manner.

U.S. Pat. No. 4,728,421 to Moddemeyer teaches a resilient compressor ball compressed to urge an axially-movable circular knife-edge onto one end of a cylindrical filter element to form a seal therewith and to urge the filter element onto a fixed circular knife-edge having a fluid outlet opening therewithin to form a seal therewith. The movable knife-edge is concentrically formed on an axially-slidable tubular compressor element which confines the compressor ball within a hollow nut portion of a cap which is screwed onto a cylindrical shell having a base from which the fixed knife-edge extends in axial alignment with the movable knife-edge. When the cap is screwed onto the shell, the compression of the ball urges the movable knife edge against one end of the filter and the other end of the filter against the fixed knife-edge so as to seal the ends of the filter element and thus the seals formed at the knife-edges, while accommodating variances in the overall length of the filter element from its nominal length.

U.S. Pat. No. 4,764,275 Robichaud relates to a fluid filter and a method for attaching same to a filter mount of an engine in sealing relation is provided. The fluid filter include a filter media; a housing for the filter media; complimentary interengageable locking devices formed radially on the filter and filter mount for engaging the filter and the filter mount; and a seal positioned between the housing and the filter mount. The locking devices include either: a first set of circumferentially spaced flanges formed on the inner wall of the housing and a second set of circumferentially spaced flanges formed on the filter mount; or a plurality of bolts attached to the filter mount or a plate attached to the housing and a corresponding plurality of holes formed in the plate or filter mount, respectively. The sealing means includes an annular, O-ring positioned between the housing and the filter mount.

U.S. Pat. No. 5,015,316 to Ostreicher et al. discloses a filter element adapted to be sealingly clamped in a filter housing. The element comprises a porous hollow cylindrical integral self-supporting bonded fibrous structure. The structure has thermally melt bonded to at least one end thereof, a thermoplastic polymer closed cell foam sealing gasket. The gasket is adapted to provide a sealing surface between the end of the cartridge and the sealing edge of the filter housing. In a preferred embodiment, the sealing edges of the filter housing used in conjunction with the aforedescribed filter element comprises at least two circular sealing edges concentric to the axis of the cylinder filter element. Such a combination provides a means for determining whether there is leakage past the sealing edges by the discoloration of the sealing gasket area between the concentric sealing edge by the liquid being filtered.

U.S. Pat. No. 5,211,846 to Kott et al. sets forth a replacement filter cartridge assembly including a filter cartridge element and a reusable supporting core assembly. The filter cartridge element is cylindrical in shape and has top and bottom end caps. Either the top end cap or the bottom end cap has an opening formed through its thickness which communicates with a central bore extending longitudinally through the filter cartridge element. The supporting core assembly includes a perforated tubular core and a sealing end cap mounted on one end of the core. The core is inserted through the top or bottom end cap opening and into the central bore of the filter cartridge element. The sealing end cap rests against either the top or bottom end cap of the filter cartridge element, while the other end of the tubular core contacts the inner side of the opposite end cap of the cartridge element. The supporting core is removable from the filter cartridge element when the filter cartridge needs to be replaced or cleaned, and may be reused on a clean filter cartridge element.

U.S. Pat. No. 5,298,160 to Ayers et al. discloses a filtration system for use to separate contamination from a liquid, including an elongated tubular housing which has a closed end and an open end. Located within the housing is an elongated perforated tubular member which has openings. A separating baffle for prohibiting flow between the housing and the tubular member is located near the closed end of housing. A first fluid portion in the housing is located between the filter element and the open end. A second port is located in the housing between the filter element and the closed end. The filter element is installed and removed through the open end of the housing and is installed between the housing and the member. A cover is placed over the open end of the housing in order that fluid which is contained within the housing may be sealed therein. A reservoir is located at the open end of the housing in order that fluid escaping from the housing during removal of the filter element may be contained within the reservoir.

Although the aforementioned prior art patent have made contributions to the filtering art, none of aforementioned prior art patents have completely solved the problems and needs of the filtering art.

Therefore, it is an object of this invention to provide an improved seal for sealing a filter element to a filter mounting incorporating a bonding pad to provide a seal between the filter element and the filter mounting.

Another object of this invention is to provide an improved seal for sealing a filter element to a filter mounting incorporating a bonding pad formed from a sintered matrix of metallic fibers to provide a seal between the filter element and the filter mounting.

Another object of this invention is to provide an improved seal for sealing a filter element to a filter mounting incorporating a mechanical fastener coacting between the filter element and the filter mounting for compressing said bonding pad to provide a seal between the filter element and the filter mounting.

Another object of this invention is to provide an improved seal for sealing a filter element to a filter mounting incorporating a bonding pad formed from the same material type as the filter element and the filter support.

Another object of this invention is to provide an improved seal for sealing a filter element to a filter mounting which eliminates the need for a welding process.

Another object of this invention is to provide an improved seal for sealing a filter element to a filter mounting which enables a first and a second end of a cylindrical filter media to be sealed to a first and a second end cap without a heating process.

Another object of this invention is to provide an improved seal for sealing a filter element to a filter mounting which enables a first and a second end of a cylindrical filter media to be removably sealed to a first and a second end cap.

Another object of this invention is to provide an improved seal for sealing a filter element to a filter mounting which enables a first and a second end of a cylindrical filter media to be sealed to a first and a second end cap without a heating process.

Another object of this invention is to provide an improved seal for sealing a filter element to a filter mounting which incorporates a limited heating process for creating a frangible seal.

Another object of this invention is to provide an improved seal for sealing a filter element to a filter mounting which incorporates a limited heating process for creating a tamper evident seal.

Another object of this invention is to provide an improved seal for sealing a filter element to a filter mounting which is capable of withstanding a cleaning solvent and an elevated temperature.

Another object of this invention is to provide an improved seal for sealing a filter element to a filter mounting having superior sealing characteristics.

Another object of this invention is to provide an improved seal for sealing a filter element to a filter mounting which is reliable for use over an extended period of time.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved seal for sealing a filter element to a filter mounting. The improved seal comprises a bonding pad formed from a sintered matrix of randomly oriented metallic fiber. The bonding pad is interposed between the filter element and the filter mounting. A mechanical fastener coacts between the filter element and the filter mounting for compressing the bonding pad to provide a seal between the filter element and the filter mounting.

In one example of the invention, the filter element comprises a filter media formed from a compressed web of a sintered matrix of randomly oriented metallic fibers. The metallic fibers of the filter media may be formed through a wire drawing process to provide a uniform diameter for uniformly filtering the fluid. Preferably, each of the metallic fibers having a diameter of less than 100 microns.

In another example of the invention, the filter element comprises a substantially cylindrical core having a first and a second core end with a plurality of apertures defined within the core. The filter media comprises a generally cylindrical filter media with the cylindrical core being disposed within and coaxial with the filter media for enabling the cylindrical core to support the cylindrical filter media thereby for enabling a fluid to flow through the filter media and to flow through the plurality of apertures defined within the core member. Preferably, the filter mounting is a metallic filter mounting and being of the same type of material as the metallic fibers of the bonding.

In a specific embodiment of the invention, the bonding pad comprises a resilient pad formed from a web of a sintered matrix of randomly oriented metallic fibers. Each of the metallic fibers of the bonding pad may be formed through a wire drawing process to provide a uniform diameter thereto. Preferably, each of the metallic fibers of the bonding pad has a diameter less than 100 microns.

The mechanical fastener may comprise a first mechanical fastener disposed relative to the filter element and a second mechanical fastener disposed relative to the filter mounting for compressing the bonding pad upon the engagement of the first mechanical fastener to the second mechanical fastener. In a specific example of the invention, the mechanical fastener comprises a first threaded fastener disposed relative to the filter element and a second threaded fastener disposed relative to the filter mounting for compressing the bonding pad upon the threaded engagement of the first threaded fastener to the second threaded fastener.

The improved seal of the present invention may include the bonding pad being optionally sinter bonded to the filter element and the filter mounting for creating a frangible seal between the filter element and the filter mounting.

The invention is also incorporated into the method of sealing a filter element to a filter mounting, comprising the steps of forming a bonding pad by sintering a matrix of randomly oriented fibers and interposing the bonding pad between the filter element and the filter mounting. A force is applied between the filter element and the filter mounting to compress the bonding pad to form a seal between the filter element and the filter mounting.

The step of applying a force may include applying a compressive force between the filter element and the filter mounting to compress the bonding pad to form a seal between the filter element and the filter mounting. In the alternative, the step of applying a force may include applying a compressive force created by a torque between the filter element and the filter mounting to compress the bonding pad to form a seal between the filter element and the filter mounting. Heat may be applied to sinter bond the bonding pad to the filter element and to the filter mounting. Preferably heat is applied for a period of time sufficient to provide a frangible sinter bond to secure the filter element and to the filter mounting and for enabling the frangible sinter bond to be severed to remove the filter element from the filter mounting.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 18 illustrates a seventh step in the method of making the fluid filter insert showing the positioning of a second filter mounting member;

FIG. 19 illustrates an eighth step in the method of making the fluid filter insert showing the engagement of the second filter mounting member with the core;

FIG. 20 illustrates a ninth step in the method of making the fluid filter insert showing the compression of the first and second bonding pads for sealing the first and second filter mounting members to the filter media;

FIG. 21 is an enlarged view of the top and bottom portions of FIG. 19;

FIG. 22 is an enlarged view of the top and bottom portions of FIG. 20;

FIG. 23 is a sectional view of a first embodiment of a sintering apparatus positioned adjacent an end of a fluid filter insert;

FIG. 24 is a view similar to FIG. 23 illustrating the movement of the fluid filter insert into a first embodiment of the sintering apparatus;

FIG. 25 is a view similar to FIG. 24 illustrating the irradiation of the end of the fluid filter insert;

FIG. 26 is a view similar to FIG. 25 illustrating the movement of the fluid filter insert out of the first embodiment of the sintering apparatus;

FIG. 29 is a view similar to FIG. 28 illustrating the irradiation of the opposed ends of the fluid filter insert; and FIG. 30 is a view similar to FIG. 29 illustrating the movement of the second embodiment of the sintering apparatus from the opposed end of the fluid filter insert.

Similar reference characters refer to similar parts throughout the several Figures of the drawings.

DETAILED DISCUSSION

Figure 1:
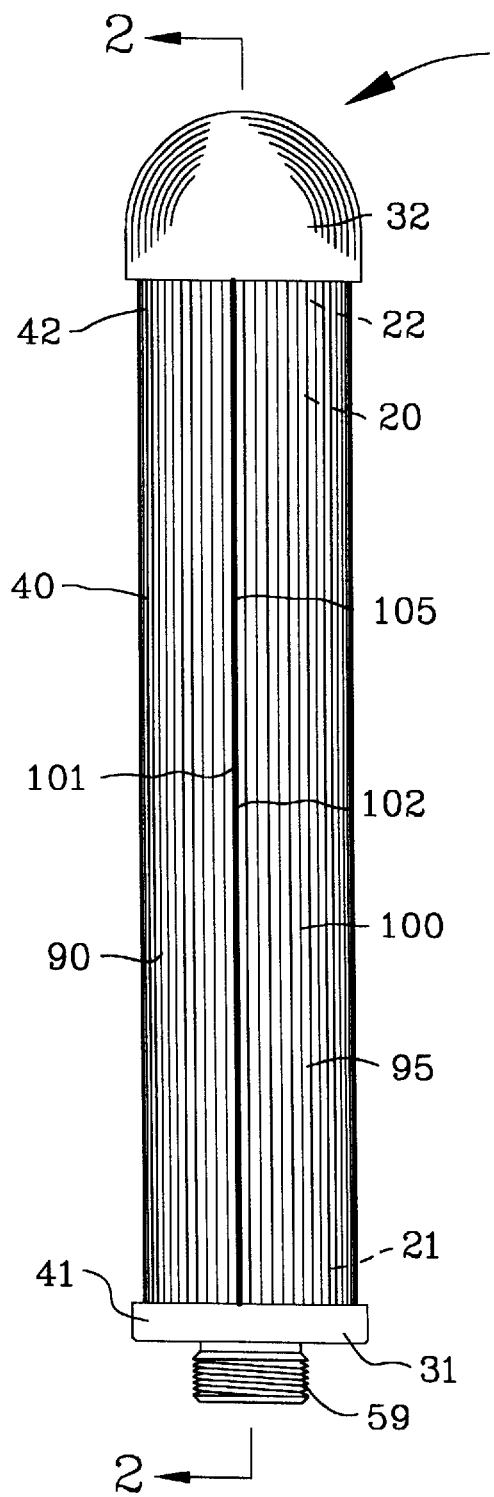
FIG. 1 is a side view of a fluid filter insert of the present invention.
Figure 2:
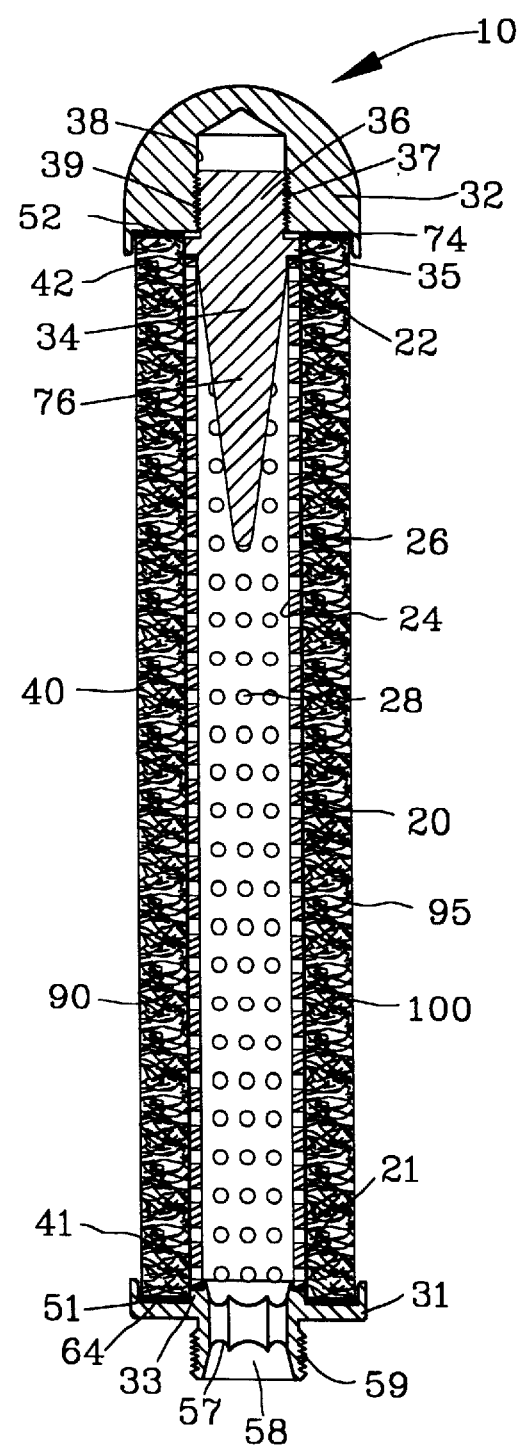
FIG. 2 is a sectional view along line 2—2 in FIG. 1.

FIG. 1 is a side elevational view of the fluid filter insert 10 with FIG. 2 being a sectional view thereof. The fluid filter insert 10 is designed for use within a conventional filter housing (not shown) for filtering suspended contaminants from a fluid. The fluid filter insert 10 comprises a core 20 extending between a first and a second core end 21 and 22. The core 20 is shown as being substantially cylindrical and being defined by an inner and an outer cylindrical surface 24 and 26. A plurality of apertures 28 are defined within the core 20 to extend between the inner and outer cylindrical surfaces 24 and 26 for enabling fluid passage therethrough.

The core 20 is disposed between a first and a second filter mounting member 31 and 32. The first mounting member 31 has a ring 33 for securing to the first end 21 of the core 20. The ring 33 of the first mounting member 31 may be secured to the first end 21 of the core 20 by a press fit, welding or any other suitable means.

The second end 22 of the core 20 receives a plug 34 having a ring 35. The ring 35 of the plug 34 is secured to the second end 22 of the core 20. The ring 35 of the plug 34 may be secured to the second end 22 of the core 20 by a press fit, welding or any other suitable means. The plug 34 includes a projection 36 having projection threads 37.

The second mounting member 32 has a bore 38 defining bore threads 39. The second mounting member 32 is secured to the second end 22 of the core 20 upon the engagement of the projection threads 37 with the bore threads 39.

A filter media 40 extends between a first and a second filter media end 41 and 42. The first and second filter media ends 41 and 42 of the filter media 40 are sealed to the first and second filter mounting members 31 and 32 by a first and a second bonding pad 51 and 52.

Figure 3:
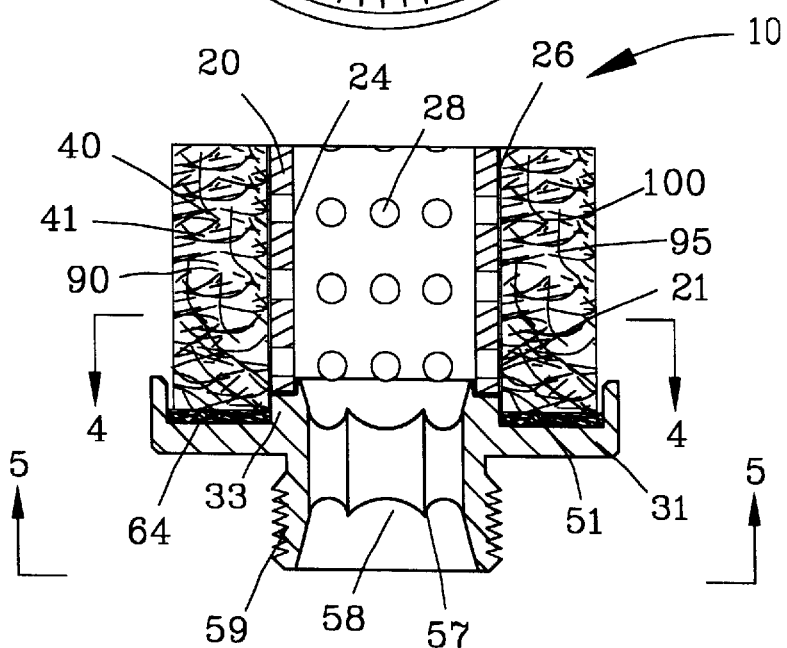
FIG. 3 is an enlarged view of a bottom portion of FIG. 2.

FIG. 3 is an enlarged view of a bottom portion of FIG. 2 illustrating the first filter mounting member 31. The first filter mounting member 31 comprises a keyway 57 defined in a central orifice 58. The central orifice 58 provides communication to the interior of the core 20. The first filter mounting member 31 is provided with threads 59 for affixing the fluid filter insert 10 to the filter housing (not shown).

The first core end 21 of the core 20 is permanently secured to the ring 33 of the first filter mounting member 31 by a press fit, welding or any other suitable means. A first annular recess 64 has a general cup-shape defined within the first filter mounting member 31. The first annular recess 64 is adapted for retaining the first bonding pad 51 therein. The first filter media end 41 of the filter media 40 is disposed within the first annular recess 64 and is sealed to the first filter mounting member 31 by the first bonding pad 51.

Figure 4:
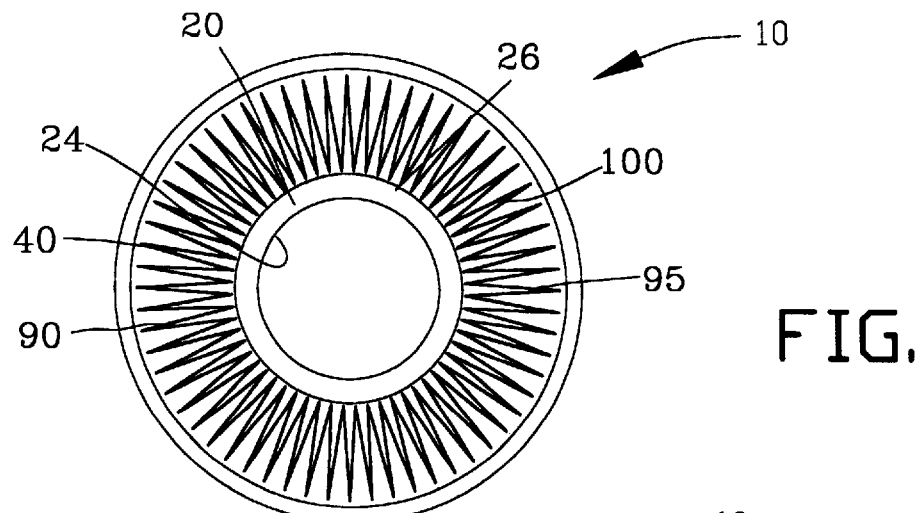
FIG. 4 is a sectional view along line 4—4 in FIG. 3.

FIG. 4 is a sectional view along line 4—4 in FIG. 3. In this example of the invention, the keyway 57 is shown as a hexagonal keyway adapted to receive a hexagonal keyed tool (not shown) for inhibiting rotation of the first filter mounting member 31. However it should be understood that numerous other types of keyways may be used with the present invention.

Figure 5:
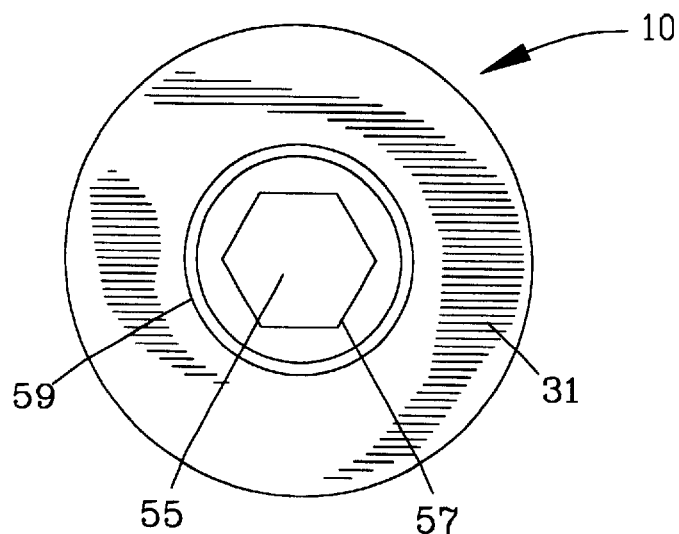
FIG. 5 is a view along line 5—5 in FIG. 3.
Figure 7:
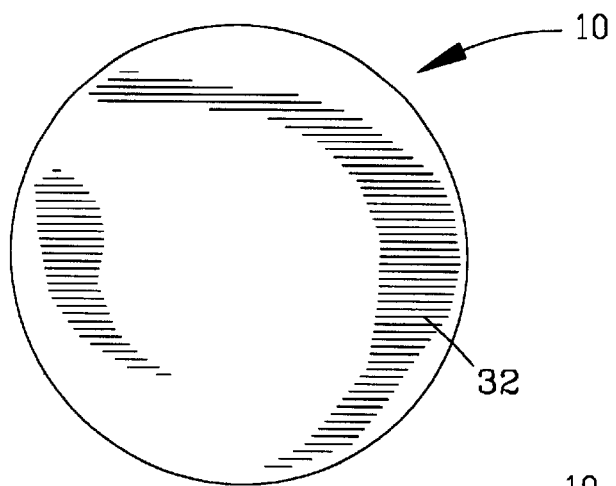
FIG. 7 is a view along line 7—7 in FIG. 6.

FIG. 5 is a view along line 5—5 in FIG. 3. The filter media 40 is shown as generally cylindrical and coaxially disposed relative to the core 20. The filter media 40 defines a generally pleated or accordion shape for increasing the surface area of the filter media 40. The filter media 40 filters suspended contaminates in the fluid flowing through the filter media 40 via the central orifice 58 of the first filter mounting member 31 and the plurality of apertures 28 of the core 20.

Figure 6:
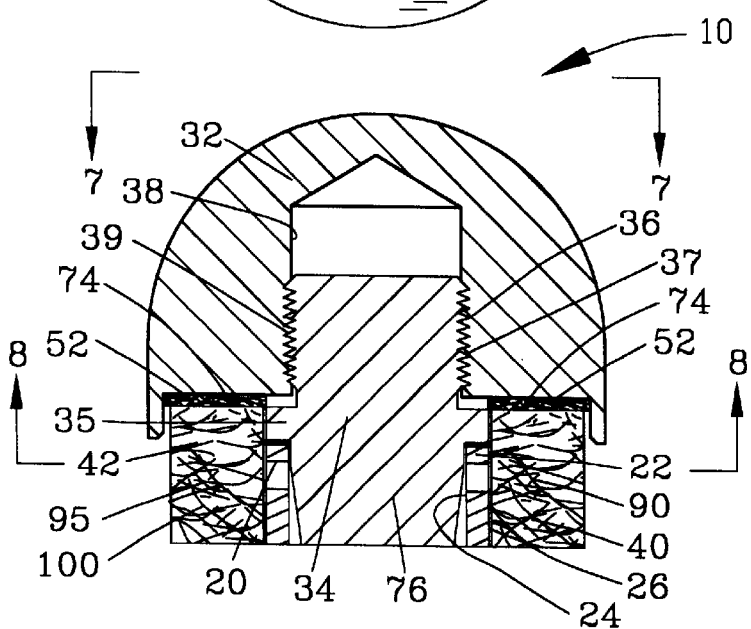
FIG. 6 is an enlarged view of a top portion of FIG. 2.
Figure 8:
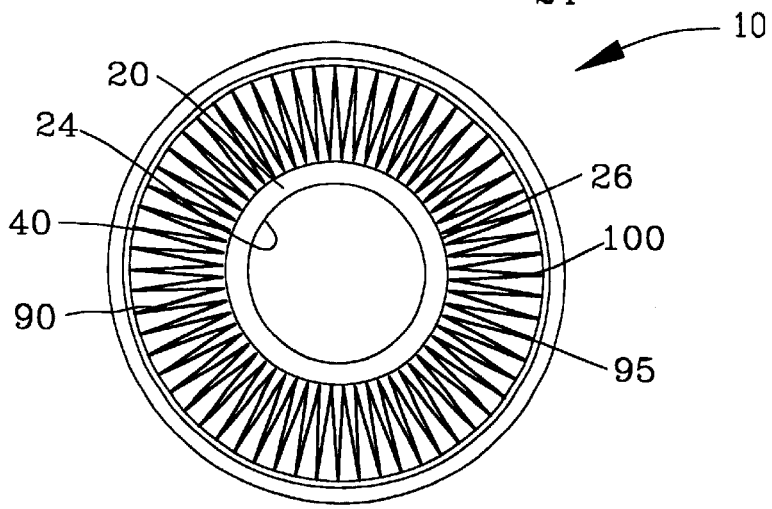
FIG. 8 is a sectional view along line 8—8 in FIG. 6.

FIG. 6 is an enlarged view of a top portion of FIG. 2. The second filter mounting member 32 comprises a second annular recess 74 having a general cup-shape defined within the second filter mounting member 32 for retaining the second bonding pad 52 therein. The bore 38 extends into the second filter mounting member 32 to define the bore threads 39.

The second end 22 of the core 20 receives the plug 34. The ring 35 is integrally formed with the plug 34 and is permanently secured to the second end 22 of the core 20 by a press fit, welding or any other suitable means. The plug 34 may include a taper 76 for facilitating the flow of fluid through the core 20. The projection 36 is integrally formed with the plug 34 with the projection threads 37 being disposed thereon.

The second filter media end 42 of the filter media 40 is disposed within the second annular recess 74. The engagement of the projection threads 37 of the projection 36 with the bore threads 39 of the bore 38 secure the second filter mounting member 32 to the second core end 22 of the core 20. Concomitantly therewith, the first and second filter media ends 41 and 42 of the filter media 40 are sealed to the first and second filter mounting members 31 and 32 by the first and second bonding pads 51 and 52. The engagement of the projection threads 37 with the bore threads 39 of the bore 38 provides a compressive force for compressing the first and second bonding pads 51 and 52 to provide the seals between the first and second filter media ends 41 and 42 and the first and second filter mounting members 31 and 32.

As best shown in FIGS. 1, 2, 4 and 8, the filter media 40 comprises a matrix of metallic fibers 90. The metallic fibers 90 are formed into a compressed sintered matrix of randomly oriented metallic fibers 90 to provide a porous filter media 40.

In one example, the filter media 40 comprises a sintered matrix of small diameter metallic fibers such as stainless steel fibers 90. The small diameter stainless steel fibers 90 are formed through a wire drawing process having a diameter of less than 100 microns. The wire drawing process provides a uniform diameter to the small diameter stainless steel fibers 90. The uniform diameter of small diameter stainless steel fibers 90 provides a uniform filtering of the suspended contaminants from the fluid.

The metallic fibers 90 are formed by cladding and drawing a plurality of metallic wires for providing a drawn cladding with a reduced diameter. Several successive drawing processes may be required to obtain the metallic fibers with the desired diameter. The cladding is removed to provide the small diameter metallic fibers 90 having a length at least one hundred times the diameter.

The metallic fibers 90 are opened to provide loose metallic fibers. The loose metallic fibers 90 are formed into a web 95. The web 95 of small diameter metallic fibers 90 is fused by a sintering process to form the filter media 40 having a multiplicity of pores therein. The web 95 of sintered filter media 40 is passed through a rolling press to compress the web 95 to have a uniform thickness with a high mechanical strength. The compressed sintered web 95 is in the form of a sheet 100 having a first and a second sheet end 101 and 102.

The sheet 100 of the sintered web 95 of the small diameter metallic fibers 90 is folded into the generally pleated or accordion shape and is bent into the generally cylindrical shape. The first and second sheet ends 101 and 102 are welded at 105 to form the generally cylindrical shape.

Figure 9:
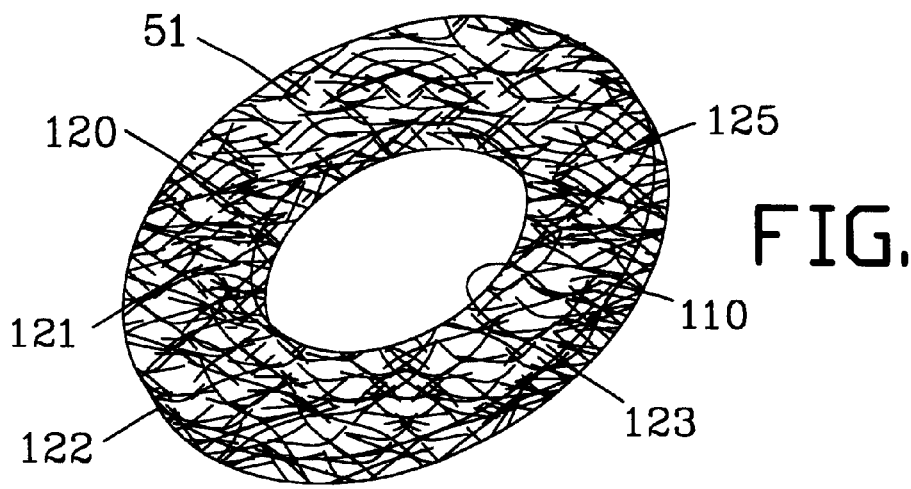
FIG. 9 is a magnified isometric view of the bonding pad of the present invention.
Figure 10:
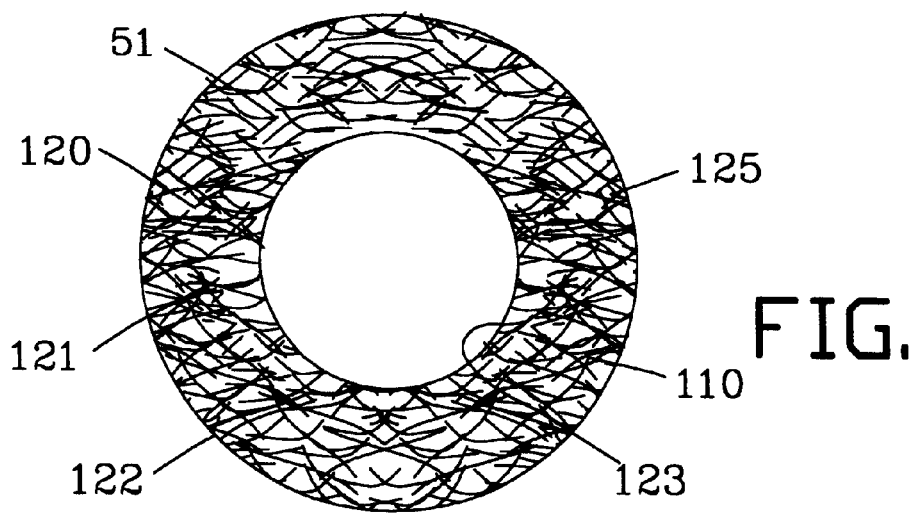
FIG. 10 is a top view of FIG. 9.
Figure 11:
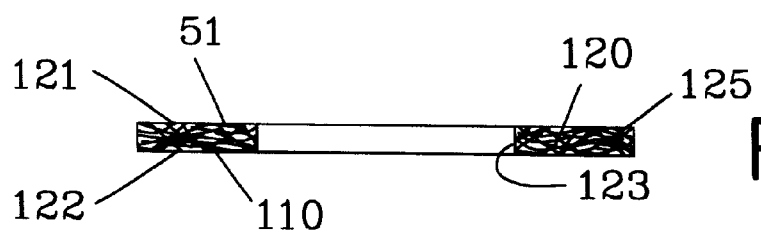
FIG. 11 is a side view of FIG. 10.

FIGS. 9–11 are magnified views of the first bonding pad 51 of the present invention. The bonding pad 51 is formed in the general shape of a washer 120 having a top and a bottom surface 121 and 122. A central orifice 123 of the bonding pad 51 receives the core 20 therein. An outer periphery 125 of the bonding pad 51 is adapted to be received within the first annular recess 64 of the first filter mounting member 31.

Preferably, the first and second bonding pad 51 and 52 are identical and comprise a resilient pad formed from a web of sintered matrix of randomly oriented metallic fibers. Preferably, the resilient bonding pad 51 is an uncompressed sintered matrix of randomly oriented metallic fibers. Preferably, the metallic fibers of the bonding pad have a diameter equal or less than each of the metallic fibers of said filter media 40 and may be formed by a wire drawing process. The bonding pad 51 may be formed of the filter media 40. The bonding pad 51 may be equivalent to the structure of the filter media 40 having a basis weight of 2.0 to 50.0 ounces per yard.

Figure 12:
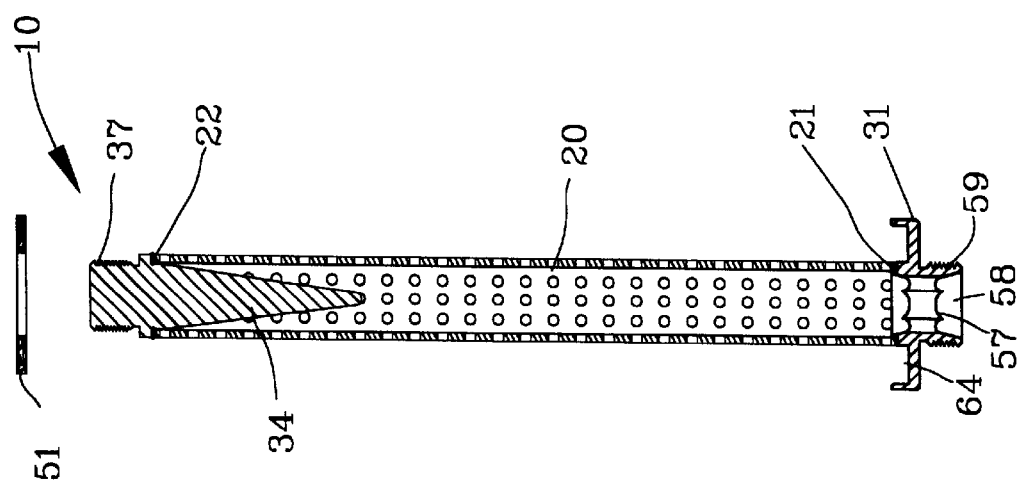
FIG. 12 illustrates a first step in the method of making the fluid filter insert showing a first filter mounting member secured to a core with a first bonding pad being positioned adjacent thereto.

FIG. 12 illustrates the first step in the method of making the fluid filter insert 10 showing the first filter mounting member 31 permanently secured to the first end 21 of the core 20. The first bonding pad 51 is positioned adjacent to the second end 22 of the core 20.

Figure 13:
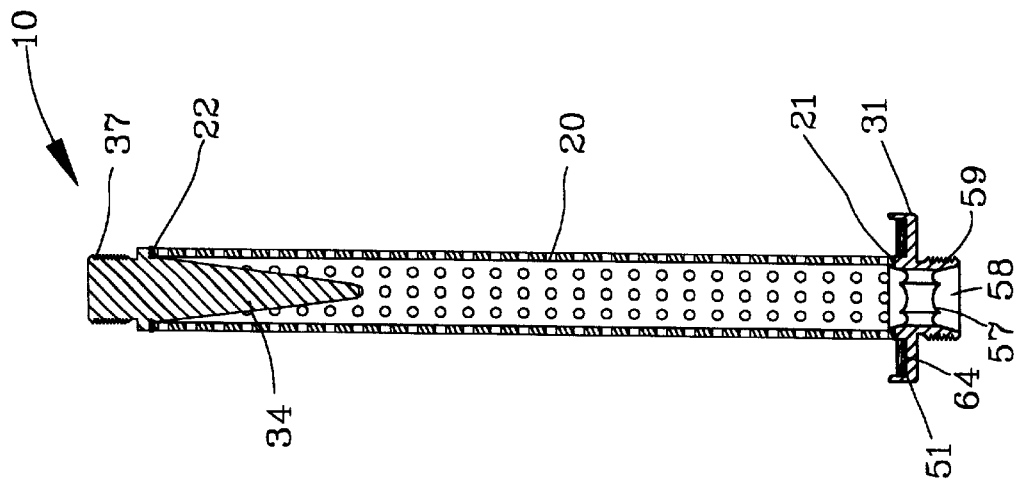
FIG. 13 illustrates a second step in the method of making the fluid filter insert showing the introduction of the first bonding pad thereto.

FIG. 13 illustrates the second step in the method of making the fluid filter insert 10 showing the introduction of the first bonding pad 51 over the second end 22 of the core 20. The first bonding pad 51 is moved over the core 20 to be positioned adjacent to the first end 21 of the core 20 and within the first annular recess 64 of the first filter mounting member 31.

Figure 14:
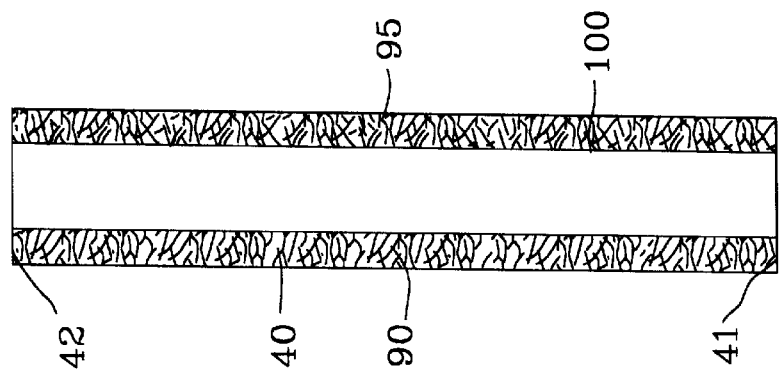
FIG. 14 illustrates a third step in the method of making the fluid filter insert showing the positioning of a filter media.

FIG. 14 illustrates the third step in the method of making the fluid filter insert 10 showing the positioning of the filter media 40 adjacent to the core 20.

Figure 15:
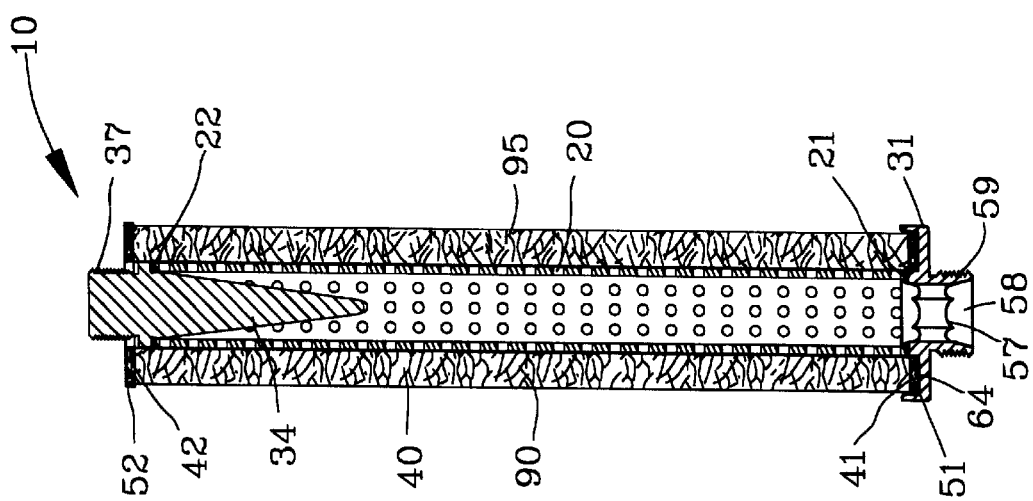
FIG. 15 illustrates a fourth step in the method of making the fluid filter insert showing the introduction of the filter media thereon.

FIG. 15 illustrates the fourth step in the method of making the fluid filter insert 10 showing the introduction of the filter media 40 on the core 20. The core 20 is disposed within and coaxial with the generally cylindrical filter media 40 for enabling the cylindrical core 20 to support the filter media 40. The first end 41 of the filter media 40 is disposed within the first annular recess 64 to engage the first bonding pad 51.

Figure 16:
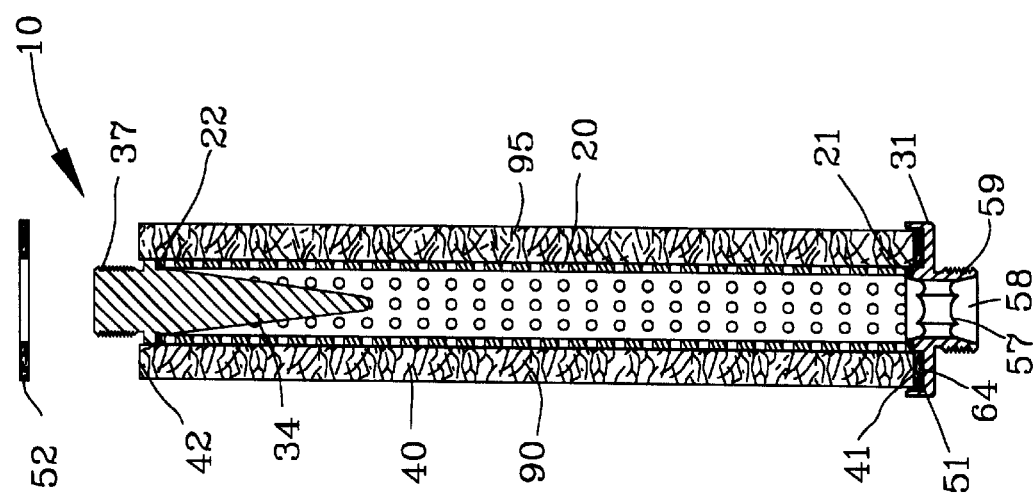
FIG. 16 illustrates a fifth step in the method of making the fluid filter insert showing a second bonding pad being positioned adjacent thereto.

FIG. 16 illustrates the fifth step in the method of making the fluid filter insert 10 showing the second bonding pad 52 being positioned adjacent to the second end 22 of the core 20.

Figure 17:
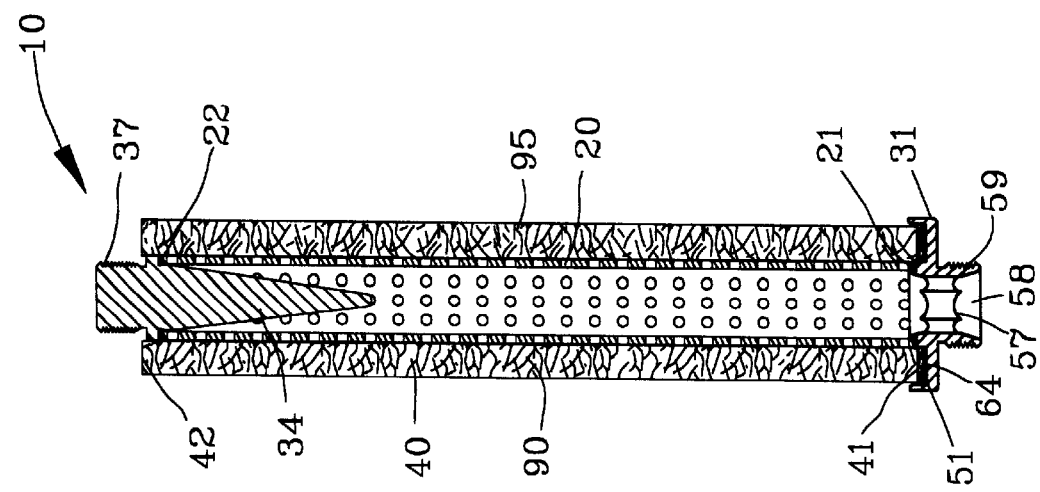
FIG. 17 illustrates a sixth step in the method of making the fluid filter insert showing the introduction of the second bonding pad.

FIG. 17 illustrates the sixth step in the method of making the fluid filter insert 10 showing the introduction of the second bonding pad 52 over the second end 22 of the core 20. The second bonding pad 52 is moved over the core 20 to be positioned adjacent to the second end 42 of the second filter mounting member 32.

FIG. 18 illustrates the seventh step in the method of making the fluid filter insert 10 showing the positioning of the second filter mounting member 32 adjacent to the second end 22 of the core 20.

FIG. 19 illustrates the eighth step in the method of making the fluid filter insert 10 showing the engagement of the second filter mounting member 32 with the second end 22 of the core 20. The second mounting member 32 is secured to the second end 22 of the core 20 upon the threading engagement of the projection threads 37 with the bore threads 39. A keyed tool (not shown) may be inserted within the keyway 57 to prevent rotation of the core 20 to facilitate the threading of the second filter mounting member 32 onto the second end 22 of the core 20.

FIG. 20 illustrates the ninth step in the method of making the fluid filter insert 10 showing the compression of the first and second bonding pads 51 and 52 for sealing the first and second filter mounting members 31 and 32 to the first and second ends 41 and 42 of the filter media 40. The rotation of the second filter mounting member 32 relative to the core 20 moves the second filter mounting member 32 downwardly in FIG. 20 to provide a compressive force between the first and second filter mounting members 31 and 32. The rotation of the second filter mounting member 32 relative to the core 20 compresses the first and second bonding pads 51 and 52 to provide the seals between the first and second filter media ends 41 and 42 and the first and second filter mounting members 31 and 32.

FIG. 21 is an enlarged view of the top and bottom portions of FIG. 19. The bore threads 39 engage with the projection threads 37 to secure second mounting member 32 to the second end 22 of the core 20. The bore threads 39 are shown engaged with the projection threads 37 sufficient to position the second bonding pad 52 within the second annular recess 74 of the second filter mounting member 32.

FIG. 22 is an enlarged view of the top and bottom portions of FIG. 20 illustrating the effect of the continued rotation of the second filter mounting member 32 from the top and bottom portions of FIG. 19. The continued rotation of the second filter mounting member 32 relative to the core 20 produces a compressive force between the first and second filter mounting members 31 and 32. This continued rotation of the second filter mounting member 32 relative to the core 20 results in the compression of the first and second bonding pads 51 and 52. The compression of the first and second bonding pads 51 and 52 forms seals between the first and second filter mounting members 31 and 32 to the first and second ends 41 and 42 of the filter media 40. In one experiment, a torque of sixty inch pounds was sufficient for forming the seals between the first and second filter mounting members 31 and 32 to the first and second ends 41 and 42 of the filter media 40.

The compression seal of the present invention eliminates the need for heating the fluid filter insert 10 to form a seal between the first and second filter mounting members 31 and 32 and the first and second ends 41 and 42 of the filter media 40. Furthermore, the filter media 40 may be removed by unthreading the second filter mounting member 32 from the second end 22 of the core 20 and removing the filter media 40 therefrom. Accordingly, the filter media 40 may be rapidly removed and interchanged through the use of the present invention.

The fluid filter insert 10 may be subjected to an optional minimal heating process to provide a frangible sinter bond to secure the filter media 40 to the first and second filter mounting members 31 and 32. For example, the fluid filter insert 10 may be heated for a period of time sufficient to partially sinter the first and/or second bonding pads 51 and 52 to the first and second ends 41 and 42 of the filter media 40 and to the first and second filter mounting members 31 and 32. The frangible sinter bond may be fractured to remove the filter media 40 from the first and second filter mounting members 31 and 32 upon the unthreading of the second filter mounting member 32 relative to the core 20. Since the frangible sinter bond is produced with a minimal heating process, the frangible sinter bond may be fractured without damage to the filter media 40.

Preferably, the optional heating process is accomplished through the use of infrared heating. The use of infrared heating may be concentrated or focused on desired regions of a fluid filter insert 10. The concentration of infrared heat eliminates the need for heating the entirety of the fluid filter insert 10.

FIG. 23 is a sectional view of a first embodiment of a sintering apparatus 200 positioned adjacent the second filter mounting member 32 of the filter insert 10. The body 210 defines an aperture 234 adapted to receive the second filter mounting member 32 of the filter insert 10.

A first and a second infrared source 251 and 252 are disposed within the body 210. A first and a second concave reflector 261 and 262 concentrate infrared radiation from the first and second infrared sources 251 and 252 toward the second filter mounting member 32.

The first and second infrared sources 251 and 252 receive operating power from a control 270 through electrical connectors 254 and 256. A first and a second optical pyrometer 281 and 282 sense the temperature of the second filter mounting member 32 of the filter insert 10. The first and second optical pyrometers 281 and 282 apply an input to the control 270 through electrical connectors 284 and 286.

FIG. 24 is a view similar to FIG. 23 illustrating the movement of the second filter mounting member 32 of the filter insert 10 into the apparatus 200. Preferably, the apparatus 200 contains a controlled atmosphere.

FIG. 25 is a view similar to FIG. 24 illustrating the irradiation of the second filter mounting member 32 of the filter insert 10. The second bonding pad 52, the filter mounting member 32 and the second end 42 of the filter media 40 are rapidly heated by the first and second infrared sources 251 and 252. Upon the application of heat, the metallic fibers of the second bonding pad 52 sinter bonds the filter media 40 to the second filter mounting member 32.

The control 270 adjusts the intensity of the first and second infrared sources 251 and 252 to irradiate the second filter mounting member 32 of the filter insert 10 with infrared energy at an intensity and for a period of time sufficient to sinter the second bonding pad 52 to the filter mounting member 32 and to the second end 42 of the filter media 40. The intensity and the duration of the first and second infrared sources 251 and 252 may be controlled by the control in accordance with a preestablished program or cycle. The filter mounting member 32 and the second end 42 of the filter media 40 rapidly cool upon termination of the irradiation by the first and second infrared sources 251 and 252.

FIG. 26 is a view similar to FIG. 25 illustrating the movement of the second filter mounting member 32 of the filter insert 10 out of the apparatus 200. The filter mounting member 32 and the second end 42 of the filter media 40 are removed from the apparatus 200 after sufficient cooling thereof.

Preferably, the core 20 and the filter media 40 and the first and second filter mounting members 31 and 32 are all constructed of the same type of material as the loose metallic bonding fibers. In one example of the present invention, the core 20 and the first and second filter mounting members 31 and 32 were fabricated from unitary pieces of 304L stainless steel. The metallic material of the bonding pads 51 and 52 was stainless steel fibers.

Figures 27, 28:
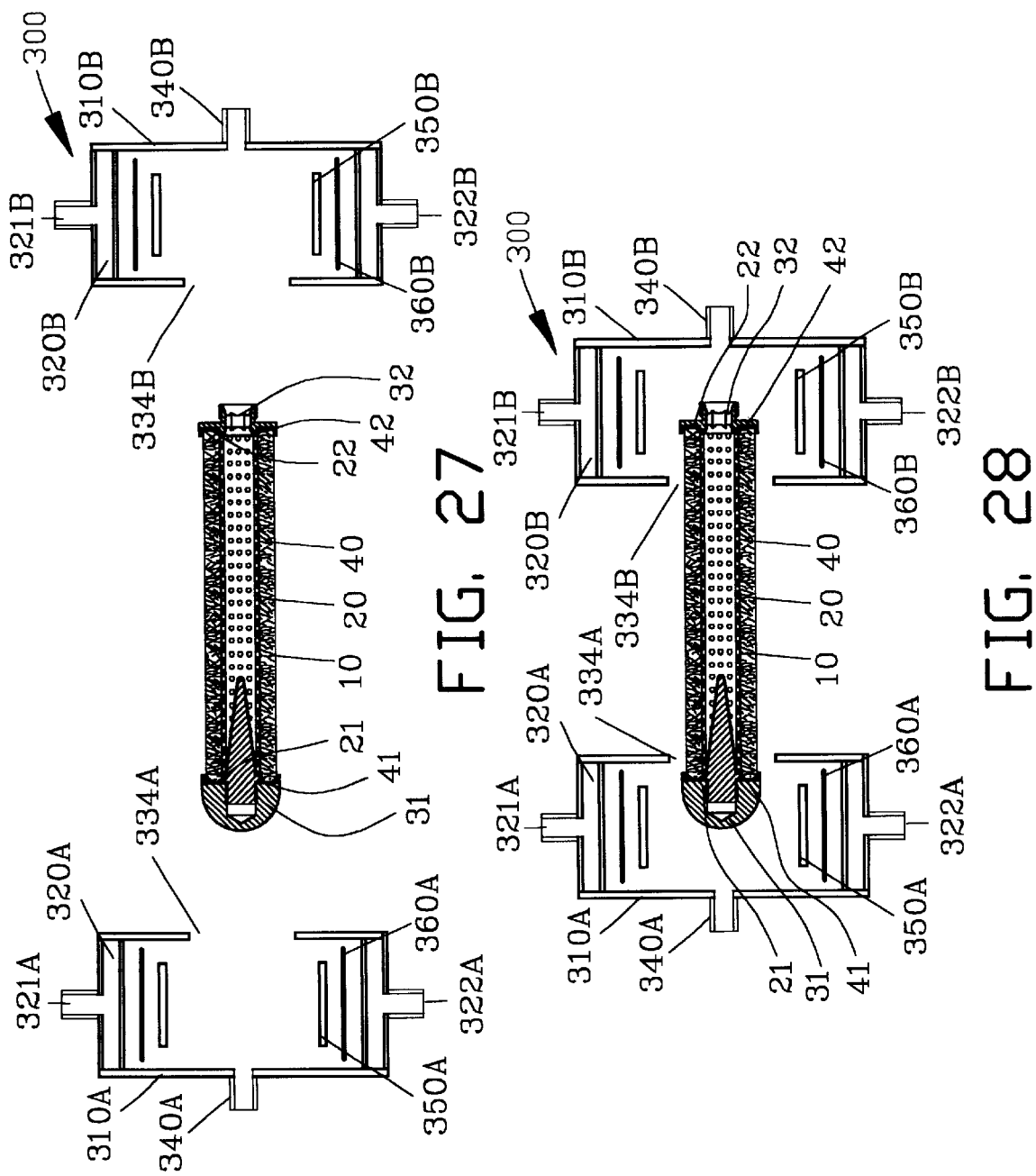
FIG. 27 is a sectional view of a second embodiment of a sintering apparatus positioned adjacent opposed ends of a fluid filter insert.
FIG. 28 is a view similar to FIG. 27 illustrating the movement of the second embodiment of the sintering apparatus for enclosing the opposed ends of the fluid filter insert.

FIG. 27 is a sectional view of a second embodiment of a sintering apparatus 300 positioned adjacent the first and second filter mounting members 31 and 32 of the fluid filter insert 10. The apparatus 300 comprises a first and a second body 310A and 310B. The first and second bodies 310A and 310B are moveable relative to one another as shown in FIGS. 27–30.

The first body 310A includes a first cylindrical cooling reservoir 320A communicating with an input and an output conduit 321A and 322A for enabling a cooling fluid (not shown) to cool the first body 310A. The first body 310A defines an aperture 334A adapted to receive the first mounting member 31. A first gas port 340A is provided for removing and/or replacing the atmosphere internal the first body 310A.

A first array of infrared sources 350A is symmetrically disposed within the first body 310A. A first cylindrical reflector 360A is interposed between the first array of infrared sources 350A and the first cooling reservoir 320A to redirect infrared radiation toward the first mounting member 31.

The second body 310B includes a second cylindrical cooling reservoir 320B communicating with an input and an output conduit 321B and 322B for enabling a cooling fluid (not shown) to cool the second body 310B. The second body 310B defines an aperture 334B adapted to receive the second mounting member 32. A second gas port 340B is provided for removing and/or replacing the atmosphere internal the first body 310B.

A second array of infrared sources 350B is symmetrically disposed within the second body 310B. A second cylindrical reflector 360B is interposed between the second array of infrared sources 350B and the second cooling reservoir 320B to redirect infrared radiation as described heretofore.

FIG. 28 is a view similar to FIG. 27 illustrating the movement of the first and second bodies 310A and 310B for receiving the first and second mounting members 31 and 32 of the fluid filter insert 10 through the apertures 334A and 334B.

FIG. 29 is a view similar to FIG. 28 illustrating the first and second arrays of infrared sources 350A and 350B irradiating the first and second mounting members 31 and 32. The first and second of infrared sources 350A and 350B are energized for a period of time sufficient to at least partially melt the bonding pads 51 and 52 to sinter bond the bonding pads 51 and 52 to the first and second mounting members 31 and 32 and to the first and second ends 41 and 42 of the filter media 40.

The fluid filter insert 10 may be rotated during the infrared irradiation as indicated by the arrow. The rotation of the fluid filter insert 10 during the infrared irradiation assists in retaining the bonding pads 51 and 52 within the first and second annular recesses 64 and 84 in the event the bonding pads 51 and 52 are heated to a melted state.

FIG. 30 is a view similar to FIG. 29 illustrating the movement of the first and second bodies 310A and 310B away from the first and second mounting members 31 and 32 of the fluid filter insert 10.

The concentration of infrared heat on the first and second mounting members 31 and 32 of the filter insert 10 inhibits the migration or wicking of the binding pads 51 and 52 into the filter media 40 during the heating process. The improved apparatus and method of infrared heating enables the simultaneous sealing of both the first and the second mounting members 31 and 32 to the first and a second ends 41 and 42 of the filter media 40.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. The method of sealing a filter element to a filter mounting, comprising the steps of:
   forming a bonding pad by sintering a matrix of randomly oriented fibers;
   interposing the bonding pad between the filter element and the filter mounting; and
   applying a compressive force created by a torque between the filter element and the filter mounting to compress the bonding pad to form a seal between the filter element and the filter mounting.

2. The method of sealing a filter element to a filter mounting as set forth in claim 1, wherein the step of fabricating the bonding pad comprises sintering a matrix of randomly oriented metallic fibers.

3. The method of sealing a filter element to a filter mounting as set forth in claim 1, wherein the step of fabricating the bonding pad comprises drawing metallic fibers in a wire drawing process to provide a uniform diameter thereof;
   forming a matrix of randomly oriented metallic fibers; and
   sintering the matrix of randomly oriented metallic fibers.

4. The method of sealing a filter element to a filter mounting as set forth in claim 1, wherein the step of interposing the bonding pad includes positioning a resilient bonding pad formed from a sintered matrix of randomly oriented fibers between the filter element and the filter mounting.

5. The method of sealing a filter element to a filter mounting, comprising the steps of:
   forming a bonding pad by sintering a matrix of randomly oriented fibers;
   interposing the bonding pad between the filter element and the filter mounting;
   applying a force between the filter element and the filter mounting to compress the bonding pad to form a seal between the filter element and the filter mounting; and
   applying heat to compress the bonding pad for a period of time sufficient to provide a frangible sinter bond to secure the filter element to the filter mounting and for requiring the frangible sinter bond to be severed to remove the filter element from the filter mounting.

6. The method of sealing a filter element to a filter mounting as set forth in claim 5, wherein the step of fabricating the bonding pad comprises sintering a matrix of randomly oriented metallic fibers.

7. The method of sealing a filter element to a filter mounting as set forth in claim 5, wherein the step of fabricating the bonding pad comprises drawing metallic fibers in a wire drawing process to provide a uniform diameter thereof;
   forming a matrix of randomly oriented metallic fibers; and
   sintering the matrix of randomly oriented metallic fibers.

8. The method of sealing a filter element to a filter mounting as set forth in claim 5, wherein the step of interposing the bonding pad includes positioning a resilient bonding pad formed from a sintered matrix of randomly oriented fibers between the filter element and the filter mounting.

9. The method of sealing a filter element to a filter mounting, comprising the steps of:
   forming a bonding pad by sintering a matrix of randomly oriented fibers;
   interposing the bonding pad between the filter element and the filter mounting;
   applying a force between the filter element and the filter mounting to compress the bonding pad to form a seal between the filter element and the filter mounting; and
   applying infrared radiation for a period of time sufficient to provide a frangible sinter bond to secure the filter element to the filter mounting and for requiring the frangible sinter bond to be severed to remove the filter element from the filter mounting.

10. The method of sealing a filter element to a filter mounting as set forth in claim 9, wherein the step of applying infrared radiation includes applying infrared radiation for a period of time sufficient to sinter bond each of the fibers of the array of the bonding pad to an adjacent fiber and to the filter element and to the filter mounting.

11. The method of making a fluid filter assembly for filtering a fluid as set forth in claim 9, wherein the step of applying infrared radiation includes applying infrared radiation within a vacuum.

12. The method of making a fluid filter assembly for filtering a fluid as set forth in claim 9, wherein the step of applying infrared radiation includes applying infrared radiation within a reactive atmosphere.

13. The method of making a fluid filter assembly for filtering a fluid as set forth in claim 9, wherein the step of applying infrared radiation includes applying infrared radiation within a non-reactive atmosphere.

14. The method of sealing a filter element to a filter mounting, comprising the steps of:
   forming a bonding pad by sintering a matrix of randomly oriented fibers;
   interposing the bonding pad between the filter element and the filter mounting; and
   applying a compressive force created by a torque between the filter element and the filter mounting to compress the bonding pad to form a seal between the filter element and the filter mounting; and
   applying heat to the compress the bonding pad for a period of time sufficient to provide a frangible sinter bond to secure the filter element to the filter mounting and for requiring the frangible sinter bond to be severed to remove the filter element from the filter mounting.

15. The method of making a fluid filter assembly for filtering a fluid, comprising the steps of:
   fabricating a filter element from a matrix of metallic fibers;
   providing a filter mounting;

forming a bonding pad by sintering a matrix of randomly oriented fibers;

interposing the bonding pad between the filter element and the filter mounting; and applying a compressive force created by a torque between the filter element and the filter mounting to compress the bonding pad to form a seal between the filter element and the filter mounting.

16. The method of making a fluid filter assembly for filtering a fluid as set forth in claim 15, wherein the step of forming the filter element comprises drawing metallic fibers in a wire drawing process to provide a uniform diameter thereof; and forming a matrix of randomly oriented metallic fibers to provide a porous filter element for filtering the fluid.

17. The method of making a fluid filter assembly for filtering a fluid as set forth in claim 15, wherein the step of forming the bonding pad comprises drawing metallic fibers in a wire drawing process to provide a uniform diameter thereof;

forming a matrix of randomly oriented metallic fibers; and sintering the matrix of randomly oriented metallic fibers.

18. The method of making a fluid filter assembly for filtering a fluid, comprising the steps of:

fabricating a filter element from a matrix of metallic fibers;

providing a filter mounting;

forming a bonding pad by sintering a matrix of randomly oriented fibers;

interposing the bonding pad between the filter element and the filter mounting;

applying a force between the filter element and the filter mounting to compress the bonding pad to form a seal between the filter element and the filter mounting; and applying heat to compress the bonding pad for a period of time sufficient to provide a frangible sinter bond to secure the filter element to the filter mounting and for requiring the frangible sinter bond to be severed to remove the filter element from the filter mounting.

19. The method of making a fluid filter assembly for filtering a fluid as set forth in claim 18, wherein the step of forming the filter element comprises drawing metallic fibers in a wire drawing process to provide a uniform diameter thereof; and forming a matrix of randomly oriented metallic fibers to provide a porous filter element for filtering the fluid.

20. The method of making a fluid filter assembly for filtering a fluid as set forth in claim 18, wherein the step of forming the bonding pad comprises drawing metallic fibers in a wire drawing process to provide a uniform diameter thereof;

forming a matrix of randomly oriented metallic fibers; and sintering the matrix of randomly oriented metallic fibers.

21. The method of making a fluid filter assembly for filtering a fluid, comprising the steps of:

fabricating a filter element from a matrix of metallic fibers;

providing a filter mounting;

forming a bonding pad by sintering a matrix of randomly oriented fibers;

interposing the bonding pad between the filter element and the filter mounting;

applying a force between the filter element and the filter mounting to compress the bonding pad to form a seal between the filter element and the filter mounting; and applying infrared radiation for a period of time sufficient to provide a frangible sinter bond to secure the filter element to the filter mounting and for requiring the frangible sinter bond to be severed to remove the filter element from the filter mounting.

22. The method of making a fluid filter assembly for filtering a fluid as set forth in claim 21, wherein the step of applying infrared radiation includes applying infrared radiation within a vacuum.

23. The method of making a fluid filter assembly for filtering a fluid as set forth in claim 21, wherein the step of applying infrared radiation includes applying infrared radiation within a reactive atmosphere.

24. The method of making a fluid filter assembly for filtering a fluid as set forth in claim 21, wherein the step of applying infrared radiation includes applying infrared radiation within a non-reactive atmosphere.

25. The method of making a fluid filter assembly for filtering a fluid, comprising the steps of:

fabricating a filter element from a matrix of metallic fibers;

providing a filter mounting;

forming a bonding pad by sintering a matrix of randomly oriented fibers;

interposing the bonding pad between the filter element and the filter mounting;

applying a compressive force created by a torque between the filter element and the filter mounting to compress the bonding pad to form a seal between the filter element and the filter mounting; and applying infrared radiation for a period of time sufficient to provide a frangible sinter bond to secure the filter element to the filter mounting and for requiring the frangible sinter bond to be severed to remove the filter element from the filter mounting.

* * * * *